United States Patent
Harris (10) Patent No.: US 9,002,945 B2
(45) Date of Patent: Apr. 7, 2015

(54) TRACKING, CORRELATING, AND PROCESSING MULTI-USER ONLINE SESSIONS

(75) Inventor: Adam Pierce Harris, San Diego, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 1159 days.

(21) Appl. No.: 12/198,578

(22) Filed: Aug. 26, 2008

(65) Prior Publication Data

US 2009/0075737 A1    Mar. 19, 2009

Related U.S. Application Data

(60) Provisional application No. 60/973,645, filed on Sep. 19, 2007.

(51) Int. Cl.
- G06F 15/16 (2006.01)
- G06Q 10/10 (2012.01)
- G07F 17/32 (2006.01)

(52) U.S. Cl.
CPC .............. *G06Q 10/109* (2013.01); *G07F 17/32* (2013.01); *G07F 17/3283* (2013.01)

(58) Field of Classification Search
USPC .................................. 709/200–226; 463/1–48
See application file for complete search history.

(56) References Cited

U.S. PATENT DOCUMENTS

| | | | |
|---|---|---|---|
| 6,273,822 B1 * | 8/2001 | Tanaka | 463/43 |
| 8,298,087 B1 * | 10/2012 | Smith | 463/42 |
| 8,332,268 B2 * | 12/2012 | Carruthers et al. | 705/14.52 |
| 2002/0103029 A1 * | 8/2002 | Finlayson et al. | 463/42 |
| 2004/0153557 A1 * | 8/2004 | Shochet et al. | 709/229 |
| 2005/0172325 A1 * | 8/2005 | Henry et al. | 725/116 |
| 2006/0200374 A1 * | 9/2006 | Nelken | 705/9 |
| 2006/0287099 A1 * | 12/2006 | Shaw et al. | 463/42 |
| 2007/0036287 A1 * | 2/2007 | Campbell | 379/67.1 |
| 2007/0072678 A1 * | 3/2007 | Dagres | 463/42 |
| 2007/0107027 A1 * | 5/2007 | Carruthers et al. | 725/97 |
| 2007/0201482 A1 * | 8/2007 | Kharebov et al. | 370/395.2 |
| 2007/0259707 A1 * | 11/2007 | Kang | 463/16 |
| 2008/0045335 A1 * | 2/2008 | Garbow et al. | 463/29 |
| 2008/0249987 A1 * | 10/2008 | Ogasawara | 707/3 |
| 2008/0277877 A1 * | 11/2008 | Rowan et al. | 273/432 |
| 2009/0042646 A1 * | 2/2009 | Sarkar et al. | 463/29 |
| 2009/0239666 A1 * | 9/2009 | Hall et al. | 463/42 |
| 2009/0325712 A1 * | 12/2009 | Rance | 463/42 |
| 2010/0255916 A1 * | 10/2010 | Sioufi Filho | 463/42 |
| 2011/0237333 A1 * | 9/2011 | Otomo et al. | 463/42 |

OTHER PUBLICATIONS

International Search Report and Written Opinion as issued in International Patent Application No. PCT/US2008/074331 on Nov. 5, 2008.

* cited by examiner

*Primary Examiner* — Anthony Mejia
(74) *Attorney, Agent, or Firm* — Procopio, Cory, Hargreaves & Savitch, LLP (57) ABSTRACT

Scheduling an online session including: determining desired time slots for an online session; determining potential users to participate in the online session; sending invitations to the potential users; receiving responses to the invitations thereby identifying participants for the online session; and entering the online session into the calendars of the participants of the online session.

20 Claims, 6 Drawing Sheets

TRACKING, CORRELATING, AND PROCESSING MULTI-USER ONLINE SESSIONS

CROSS-REFERENCE TO RELATED APPLICATIONS

This application claims the benefits of priority of U.S. Provisional Patent Application No. 60/973,645, filed Sep. 19, 2007, entitled "Method and Apparatus for Tracking, Correlating, and Processing Multi-User On-line Sessions". The disclosure of the above-referenced patent application is incorporated herein by reference.

BACKGROUND

1. Field of the Invention

The present invention relates to online sessions, and more specifically, to tracking, correlating, and processing online sessions.

2. Background

In typical online sessions, such as game applications, players may interact and communicate with partners and other online game users and virtual worlds during the online experience. The effectiveness of the experience can be important to the user, who may have many choices of online sessions, such as games and other activities.

For example, an individual wishing to play an online game needs to find a game that is going on at a time that is convenient for the individual to play. That is, there are only limited times in an individual's schedule that he/she can devote to game play. Further, if the individual wants to play the online game with friends or associates, then a time that is convenient for all of the players needs to be found. Coordinating the schedules of multiple game players can be difficult and lead to frustration of the players. For example, if an individual decides during the day that he/she would like to play a game that evening, then the individual needs to contact the other players and suggest a time to play the game. As the other players check their schedules, it is likely that there will be conflicts and some of the players will request that the game be played at a different time. This process will lead to multiple text messages, or emails, or the like, for the players to try and find a time that will accommodate all of the players. This scheduling can be very frustrating for the players.

Thus, there is a need for improving tracking, correlating, and processing online sessions.

SUMMARY

Embodiments of the present invention provide for tracking, correlating, and processing online sessions.

In one embodiment, a method for scheduling an online session includes: determining desired time slots for an online session; determining potential users to participate in the online session; sending invitations to the potential users; receiving responses to the invitations thereby identifying participants for the online session; and entering the online session into the calendars of the participants of the online session.

In another embodiment, a method of scheduling an online session includes: monitoring online behaviors of users; receiving a request for the online session from a requesting user, wherein the request includes a list of desired users for the online session; providing the requesting user with a list of potential time slots for the online session based on the online behaviors of the desired users; selecting at least one time slot from the list of potential time slots; sending invitations for the online session to be held at the at least one time slot to the desired users; receiving responses accepting the invitations to the online session thereby identifying participants for the online session; and entering the online session into the calendar of the desired users that accepted the invitation.

In a further embodiment, a controller that schedules a session on a network includes: a network interface that receives and sends data to the network; a processor that monitors user data on the network to determine profile information of behaviors of users on the network; and a memory that stores the profile information, wherein the processor receives a request for the session on the network, wherein the request includes a list of desired users for the session, and wherein the processor determines a list of potential time slots for the session on the network based on the request and the profile information.

Other features and advantages of the present invention will become more readily apparent to those of ordinary skill in the art after reviewing the following detailed description and accompanying drawings.

DETAILED DESCRIPTION

After reading the following description it would become apparent to one skilled in the art how to implement the invention in various alternative embodiments and alternative applications. However, although various embodiments of the present invention will be described herein, it is to be understood that these embodiments are presented by way of example only, and not limitations. As such, this detailed description of various embodiments should not be construed to limit the scope or breadth of the present invention.

Figure 1:
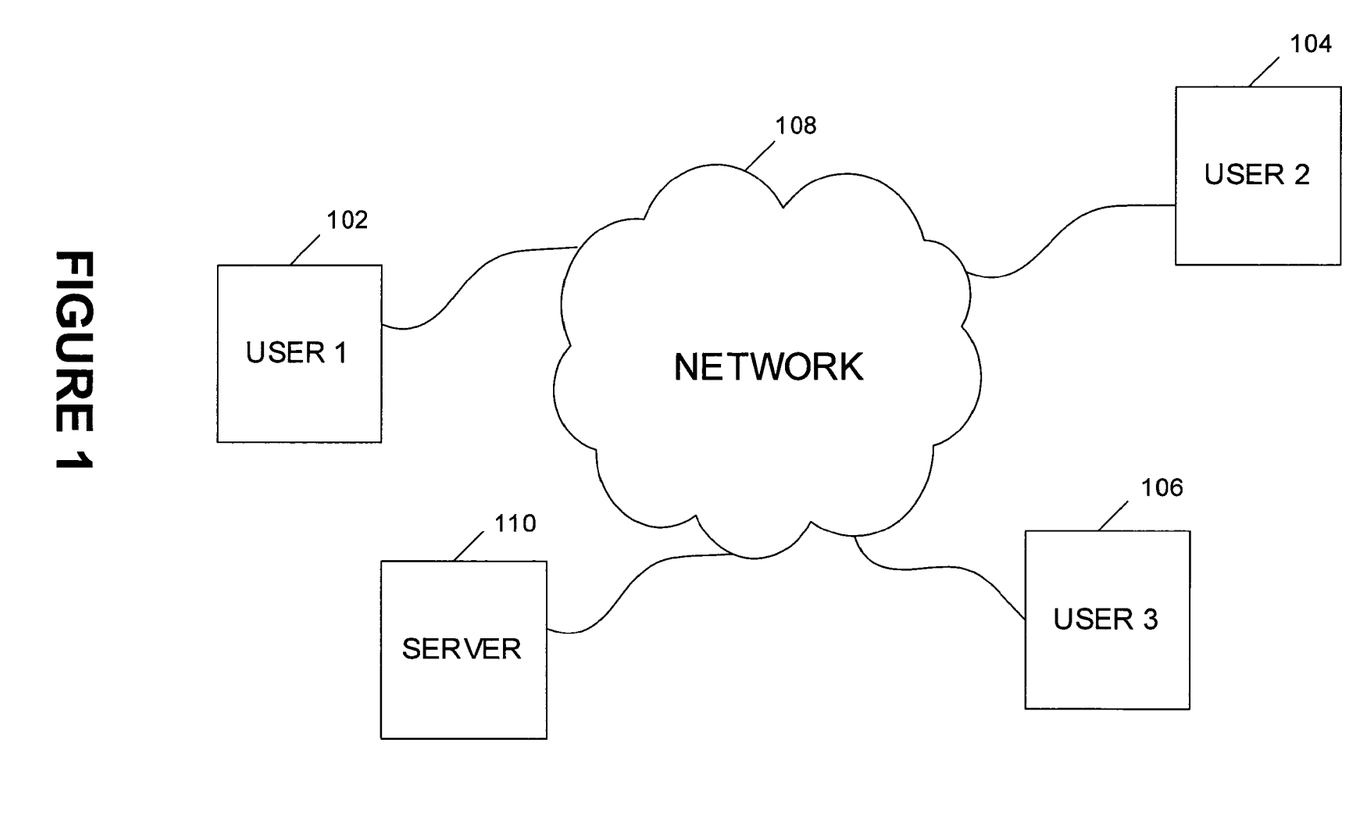
FIG. 1 is a block diagram of an example online game environment.

FIG. 1 is a block diagram of an example online environment. As shown in FIG. 1, multiple users 102, 104, and 106 can interact and enter into online session, such as online games, over a network 108. The network 108 can be connected in many different architectures, for example, a Client Server architecture, a Peer-to-Peer network architecture, or other type of architectures. For example, the online environment can include a server 110 that coordinates the online session. Also, the network can be different types of networks. For example, the network 108 can be the Internet, a Local Area Network or any variations of Local Area Network, a Wide Area Network, a Metropolitan Area Network, an Intranet or Extranet, or a wireless network. Also, the term "online session" can be used to identify any network topology where different users are connected to a network and to send and receive information from other users connected to the network. In one example, an online session can be an online game where users connected to the network send and receive information pertaining to a game.

In one embodiment, users can schedule time to enter into an online session with others. For example, a user may want to schedule a time to play an online game with other users In the context of playing online games, players are increasingly interested in playing with friends, or other acquaintances. However, it can be difficult arranging "meeting/playing times" with one or more friends because "play schedules" among the various individuals can vary greatly. It might not be too difficult to coordinate with just one person, but as the number of individuals increase, coordinating schedules can become very difficult.

One approach to scheduling is for players to provide suggestions to the group and get back responses. If not everyone says 'yes', then the player has to provide another suggestion. Determining whether it is a good time to play is not just dependent upon whether the person is 'busy' or not, but can also be dependent on other things, such as a time that a person will usually be playing a given game. For example, players often have regular game playing patterns, such as playing particular games at particular times of day. That is, a player may often play a game regularly at given times (e.g., every Sunday from 3 pm-4 pm and Monday from 6 pm-10 pm). These tendencies of players can be leverage to aide players in scheduling times at which they can play together.

One embodiment tracks a game playing habits of a player (or a user) and schedules, and uses that information to generate multi-player play session times that have the highest likelihood for success. An example of tracking a game playing habits of a user includes recording/logging all times that a user plays online. This information can then be used to generate a probability chart that shows, based upon past history, when a user is likely to be playing the game. In one example, this information can be presented as days of the week and hours in a day. Table 1 below shows an example of the type of data of a player's time online that can be collected. The probability of a user being online can be narrowed to track the probability of a player being online and engaged in a particular activity. For example, the probability of a player being online and engaged in an online game, or a particular game or type of game, or engaged in a chat room, or shopping online, etc., and be recorded and logged.

TABLE 1

| Day | Time | Probability of being Online in a particular activity |
| --- | --- | --- |
| Sunday | 3:00 PM-4:00 PM | 80% |
|  | 10:00 PM-11:00 PM | 20% |
| Monday | 7:00 PM-10:00 PM | 70% |
| Tuesday |  |  |
| Wednesday |  |  |
| Thursday | 10:00 PM-11:00 PM | 20% |
| Friday |  |  |
| Saturday | 6:00 AM-8:00 AM | 90% |

In one embodiment, a scheduler and meeting "suggester", or intelligent scheduler, can use information, including information such as that collected in Table 1, to suggest a date and time of for individuals to engage in a particular type of online session, such as an online game. In one example, a first player (A) can request a suggested date and time when a group of players, such as a group of three players (A, B and C) could play together.

Using data, such as that shown in the example data from Table 1, for all three players, the result could be, for example, as shown in Table 2:

TABLE 2

| Day | Time | Probability of All Players being Online |
| --- | --- | --- |
| Monday | 7:00 PM-7:00 PM | 60% |
| Saturday | 7:00 AM-8:00 AM | 50% |

Using the probability of when the players will be online, for a particular type of activity, an estimate can be made of the chance that all the players would be online at the same time in selected time slots. Using this technique, it is then possible to check the selected times against the schedules of the other users (i.e., the times that the other users already have committed) and suggest a meeting time. The user can then select one of the possible times and send an invitation, either manually or automatically, to the other users.

In one embodiment, aspects about a particular online session, such as a type of game, can be identified to determine if a session qualifies as a type of session that the user would be interested in. For example, aspects of a game can be identified and used to determine if the game qualifies as a type of game that a player likes. In one example, players can be identified that have similar likes and then the schedules of the players could be checked to see if there is a common time available that is convenient for the players to engage in the online game.

For example, if an online game is a role playing game, and one player is identified as a player who likes to play warrior characters but does not like to play magic characters, then this identification of the player can be considered in determining if the player would be a potential player in the game. Using the intelligent scheduling model, a time when the player can participate in a game in accordance with their preferences, such as playing a warrior character, can be identified. That is, likes and dislikes of a player, as well as schedule availability can be taken into account in scheduling online activity.

Checking the schedules of players who are going to participate in an online activity has an advantage of providing the scheduled players with prior knowledge of the session durations of other players. That is, the players join the session knowing that certain other players may have to leave the activity at a given time. In this way a player that has only limited time can still participate in an activity, or choose not to participate, without feeling guilty that he/she will have to leave and frustrate the other players. For example, if a group of game players is scheduled to play a game for a selected time period, then at the end of the time period all of the players know that some, or all, of the players may leave the game. In one embodiment, a player that is going to leave a game may be replaced by another player who has been arranged ahead of time to take the place of the player that is leaving.

In another embodiment, a group of players, for example five players, may be engaged in an online game. To maintain some consistency in the game, a set of players, for example four of the five players may be "permanent" while the remaining player can be a player that is a rolling replacement. In this way, there will be some continuity in the session, but then the other players know that the fifth player is a rolling replacement. Allowing one of the game players to be replaced may make the game more enjoyable to the remaining players because the replacement player will have different tendencies and skill levels as the player is replaced and the game dynamics change.

In one embodiment, when a user logs onto a server, the server can monitor and track that the user has logged in, how long the user is online, what activity the user is engaged in during the session, and so on. Using this data, a profile of a user can be developed. For example, a user profile can include data which identifies that the user likes to play certain types of characters in an online game, or that the user likes to participate in particular types of missions, and so on.

In an embodiment, the user profile can be used in a time management system. Thus, when a user wants to play an online game with other users, the system can predict the probability of time slots that will work for all of the users. That is, the system can analyze the behavior of users from a time and tendency standpoint, use profiles that have been developed for users, and then generate a schedule of possible, high percentage, probable time slots that are convenient for the entire group and meet the individual user's tendency.

In an embodiment, users can manually override portions of their profile data. For example, a user can block out times that they will not be available, or times that they are available, or identify times that the user is profiled as not being available but is now available. These manual overrides can take into account issues, such as, appointments that may come up, or vacations, or other events that are out of the ordinary pattern that a user follows.

While many of the embodiments described herein deal with online gaming, the features described are not limited to online gaming. For example, a user's behavior in any online activity can be profiled and used to match aspects of the user's profile to other users' profiles.

Figure 2:
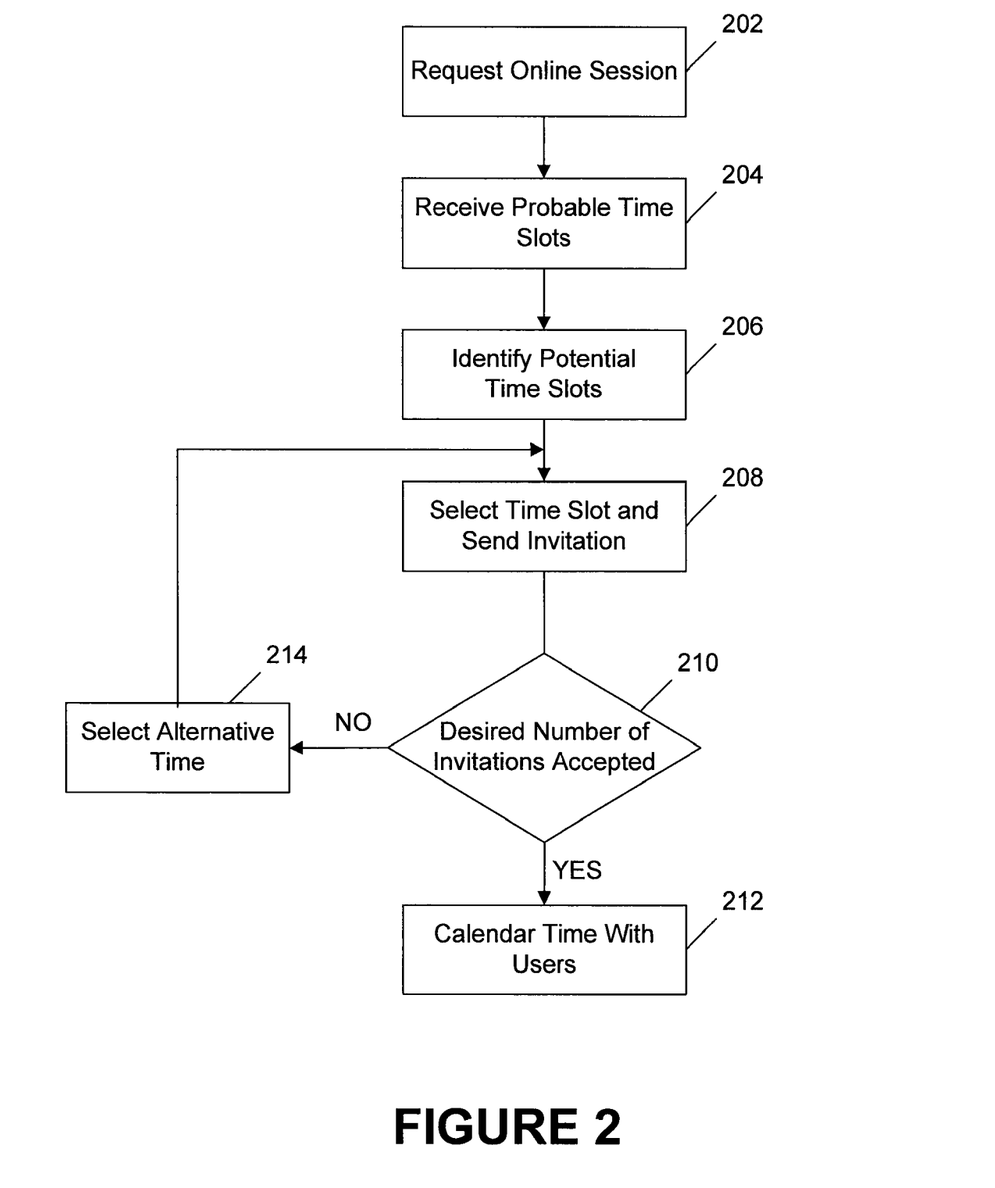
FIG. 2 is a flow chart of an example embodiment of correlating multi-user online sessions.

FIG. 2 is a flow chart of an example embodiment of correlating multi-user online sessions. In block 202, a user that wishes to setup an online session, such as an online game session or chat session or other session to engage other users online, requests a time for the session with selected users. An intelligent scheduler receives the user's request for a session time, in block 204. The intelligent scheduler evaluates, in block 206, the profile of the user making the request, as well as the profiles of the other users included in the request. The intelligent scheduler then selects times that the users will most likely be available for the online session. For example, the intelligent scheduler can determine multiple times and provide a probability associated with each time indicating the likelihood that a maximum number of users will be available. In one example, all of the users' participation is equally weighted. In another example, different users can have different "weights" indicating that the requesting user may have a higher desire that particular users are included in the session and so their profiles may be given more weight in selecting a time. For example, if requesting users want to make sure their best friend participates in the session they may give their participation a higher weighting than another user who is a casual acquaintance. In block 208, the requesting user can evaluate the times and probabilities provided by the intelligent scheduler. The user can then select a desired time and send invitations to the other users. In one embodiment, the requesting user sends an invitation with a single time. In another embodiment, the requesting user sends an invitation that includes multiple times so that the other users can select one or more of the multiple times that works best with their schedule.

In block 210, the requesting user receives responses from the other users indicating whether the invitation was accepted or declined. The responses can be simply a yes or no, or the response can include other information from the other users, such as that they are not interested in joining the session, or that they are interested but they are only available for a portion of the time that the session is scheduled, or that they are interested in joining the session but there is a time that fits their schedule better, or other information. If the requesting user decides, in block 210, that an acceptable number of other users have accepted the invitation, the session can be added, in block 212, to the accepting user's calendar. In other embodiments, other techniques can be used to notify an accepting user of the session time, such as emailing, text messaging, voice mail, or other types of communication.

If the requesting user decides, in block 210, that an acceptable number of other users have not accepted, then the requesting user can modify the invitation, in block 214. For example, the requesting user can select another time received from the intelligent scheduler, or the requesting user can change the request and receive new times and probabilities from the intelligent scheduler or the requesting user can manually select a new time. Flow then continues to block 208 and new invitations are sent to the other users.

Figure 3:
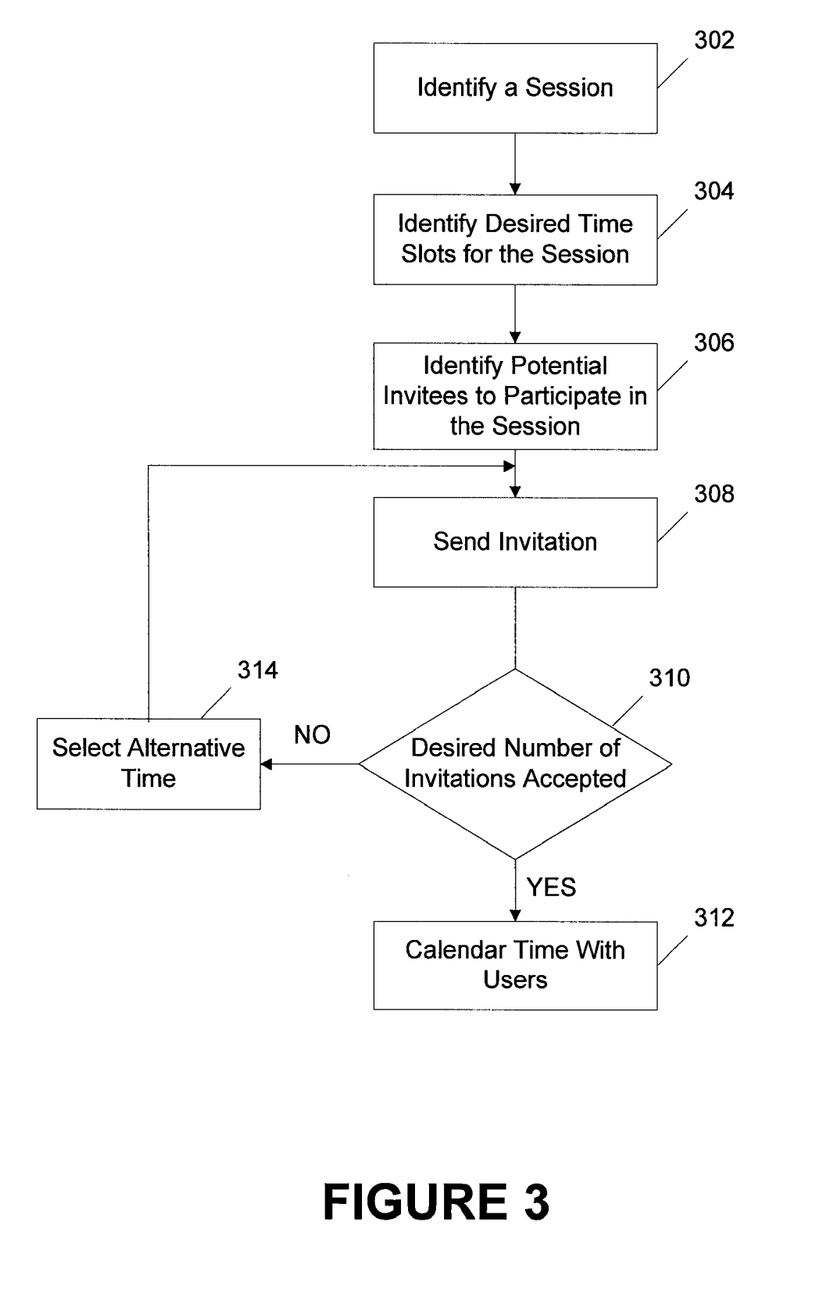
FIG. 3 is a flow chart of another example embodiment of correlating multi-user online sessions.

FIG. 3 is a flow chart of another example embodiment of correlating multi-user online sessions. In the embodiment of FIG. 3, the requesting user may not know the players that are being invited to join the session. In block 302, the requesting user identifies an online session that they want to initiate. For example, the requesting user may want to initiate an online game, or an online chat session, or other online session, with people who share a common interest such as a hobby or sport like skateboarding or surfing, or in a particular band, or other common interests. The requesting user then identifies desired time slots for the online session, in block 304. The information about the online session and the time slots is used, in block 306, to search the profiles of other users, and to determine which other users may be interested in the online session as well as if they are available. This search can include profiles of other users that the requesting user knows as well as other users that the requesting user does not know.

In block 308, invitations are sent to the identified other users. In one embodiment, the requesting user determines the other users to whom the invitations are to be sent. In another embodiment, the invitations are automatically sent to the other users. The other users respond to the invitation in block 310. In one embodiment, the other users accept or reject the invitation. In another embodiment, the other users can send a message to the requesting user. In one example, the message indicates that the other user would like to participate but suggests another time that would work better for the other user. If, in block 310, a sufficient number of invitations are accepted, then the session is calendared in the user's calendar, in block 312.

Returning to block 310, if a sufficient number of invitations are not accepted, the requesting user can select an alternative time for the online session, in block 314, and new invitations are sent to the other users, in block 308.

In still another embodiment, the requesting user can post an invitation to a bulletin board or other online public location. For example, in the virtual reality world "Home"® by Sony Computer Entertainment America, a requesting user can post a billboard, or write it on a wall, or post it in other similar ways to announce the online session. Other users can read the posting and respond if they want to participate. The posting can be for more than one session and for more than one online game. For example, a requesting user can post a list of the times that the user is available to participate in online sessions, and a list of online session subject matters that the user is interested in. Other users can then respond to the posting by providing the requesting user with options of different online sessions that are available for them to participate in during the posted time. In another embodiment, a requesting user can find out about online session that others are putting together and join those sessions.

In still another embodiment, a requesting user can post a request for users that want to participate in a particular online session, without restricting the schedule. That is, a requesting user may not be concerned with schedule but instead primarily concerned with finding other users interested in the same subject matter.

In one embodiment, building profiles of online users are accomplished by a server, or other entity, that can monitor the activities of online users as they navigate their virtual world. The server can build up profiles that can be used to identify a user's likes and dislikes and also to project trends of what a user may like based on the user's past behaviors.

Examples of online sessions can include many different activities. For example, online sessions can include entertainment habits, gaming entertainment habits, online shopping habits, as well as others. Intelligent scheduler techniques can be used to enhance a user's activities in all of these areas. For example, a user's activity can be tracked, such as if a user likes to watch movies at a particular time. The intelligent scheduler can provide suggestions to the user as to what other entertainment may be available to the user during that time. For example, if a user watches movies on Wednesday nights from 8:00 PM to 10:00 PM, the intelligent scheduler can review profiles of the user's friends and determine that the user's friends play a game that the user likes during the same time. The intelligent scheduler can suggest to the user that instead of a movie during that time, the user may enjoy playing a game with friends instead. Likewise, the intelligent scheduler can determine that a group of users are all engaged in different types of entertainment at the same time periods, and the intelligent scheduler can suggest to the friends that they could all enjoy the same entertainment with each other during that time period. For example, the friend could all watch the same online movie and communicate with each other online during the movie.

In still another embodiment, a user can be engaged in one form of entertainment and then switch to another form of entertainment. For example, a user can be watching a television program. When a commercial comes on, the intelligent scheduler can provide the user with other entertainment options. For example, the user can be offered the option to join a game and engage in the game during the commercial. In one example, a group of friends can be watching the same television program. During the commercial break the friends may then switch to an online game and play the game during the commercial break. Then, at the end of the commercial break, the game can be paused and the friends are returned to the television program.

In one embodiment, the time and duration of commercials in a television program can be learned. For example, a user can watch a television show every week. During the show, the user can identify the beginning and end of commercial periods during the television program. Because the location and duration of commercials during a television show are fairly consistent from episode to episode, the location and period of commercial breaks can be learned. This information can then be used to offer the user alternative entertainment during the commercial periods while watching the television show in the future. In another embodiment, a monitor on the same online network as the user can be monitoring the television program, such as watching the program. When a commercial begins the monitor can send an indication to the user so that the user can switch to another form of entertainment. The monitor can continue to monitor the program and notify the user when the commercial has completed so that the user can return to the television program. In another embodiment, switching between the television program and the other form of entertainment can be done automatically. This feature can be combined with a recording mechanism so that the user does not miss program content during switching.

As noted, in the example embodiments described above, there is included a system that does pattern analysis, and behavioral analysis. In other embodiments, analysis and storage can be extended to issues beyond user patterns. Analysis of patterns and behavior can be used to generate an action based upon patterns and behavior of the online users. The actions can be in real time, or they can be stored and retrieved later.

In another embodiment, scheduling can be performed for multiple entertainment needs of a user. Thus, a user can watch DVDs, surf the Internet, do e-mail, and play games. These activities can all be correlated. By providing scheduling information, a user is able to more efficiently manage other activities, not just online activities.

In another embodiment, a user's activity, such as an entertainment activity, can be tracked. For example, a parent can purchase for a child a game console. An intelligent scheduler can monitor the child's activity on the game console, such as which games the child is playing, how much time the child spends playing each game, how much time is spent on the Internet, what Web sites are visited and how much time was spent at the Web site, and so on. A report of the child's activity can be forwarded to the parent, such as by email, or otherwise communicated to the parent. The parent can then take appropriate actions based on the report.

In one embodiment, tracking and monitoring a user's activity can be based upon an opt-in basis. That is, a user's activity is tracked if the user agrees to have the activity monitored and tracked.

In one embodiment, the intelligent schedule can exchange data with other scheduling systems, such as Microsoft Outlook® or Lotus Notes®. Using information from a user's scheduling system along with a user's profile information allows the intelligent scheduler to make better predictions of when a user will be available, and want to participate in an online session. Further, information about scheduled online sessions can be provided to the other scheduling systems so that the online session times can be included in these schedules. This allows the user to have a more complete schedule which includes online session schedules along with other scheduled items.

In an embodiment, game developers can be encouraged to support a scheduling protocol. Game developers currently support other types of third party protocols, such as text messaging and short message service (SMS). The game developer can also support an online game scheduler. For example, the game developer can include a network connection to a known service on a known port, such as a transmission control protocol (TCP) or user data protocol (UDP) connection, and then use the protocol layer above the TCP to communicate with the online scheduler.

The scheduling feature can also be used with legacy systems. For example, if a game console, such as Playstation 3® (PS3) by Sony Computer Entertainment, is used to play a legacy game, such as a PS2 game, the PS3 console can detect the title of the legacy game that the user is playing, as well as the time of day and the length of play. This information can be used to develop, or update, the user's profile. In this example, the user may not be able to use a game interface of the legacy game to get information about the user's schedule, but the user's habits can still be tracked.

In another embodiment, scheduling takes into account a user's preferences. For example, a user may want to have an online session at a particular time, with specific people, or with people of a particular skill level. Other preferences can include things like the desired gender of other players, types of game characters that are available to the player, and so on.

Figure 4:
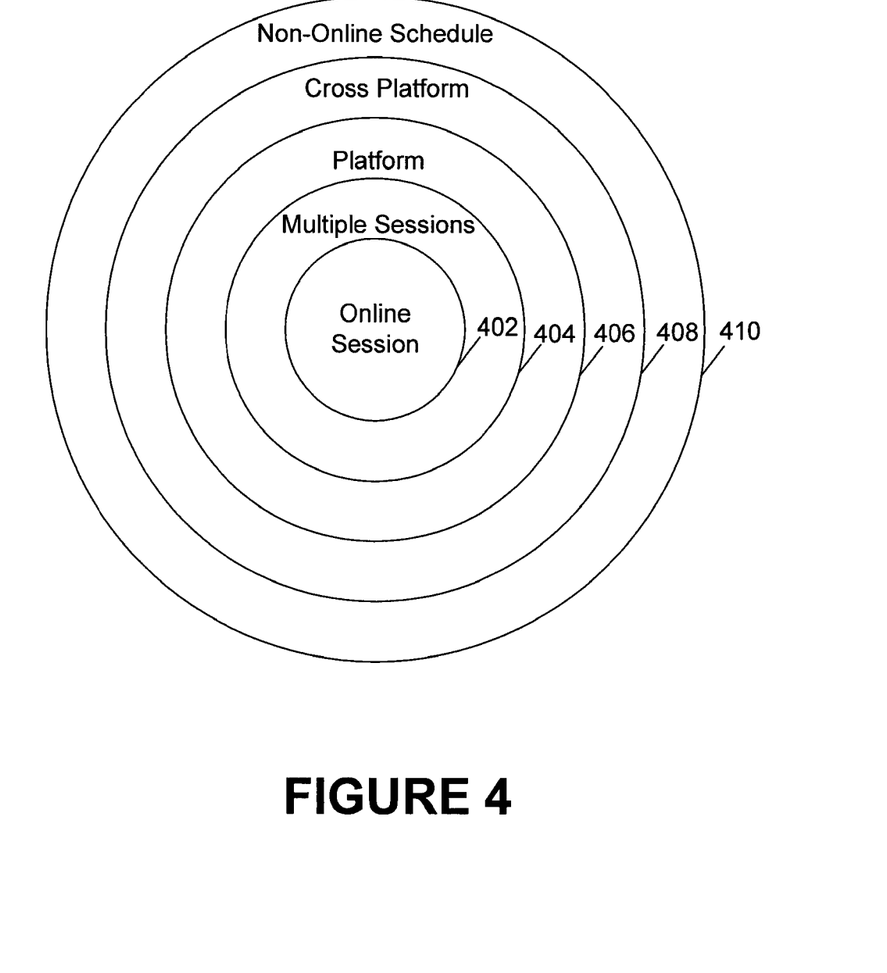
FIG. 4 is a diagram illustrating an embodiment of layering of the scheduling technique across multiple platforms.

FIG. 4 is a diagram illustrating an embodiment of layering of a scheduling technique across multiple platforms. As shown in FIG. 4, at the lowest layer 402 is a scheduler of an online session, such as an online game scheduler. At this level a user can use the scheduling techniques described herein to set up a schedule for the online session based on the user's preferences. The online schedule at the lowest level 402 can be used at the next highest level 404 where schedules across multiple online sessions are coordinated. For example, multiple game schedules can be coordinated at this level, such as in Home® by Sony Computer Entertainment. The multiple online session schedules can then be provided to the next highest layer 406 where activities across the host platform are coordinated. For example, a host platform may include access to online games as well as other activities such as watching movies. At this level the user's schedules for multiple activities are coordinated such as when a user schedules time to play online games as well as watch movies, or any other activity that is supported by the host platform.

The user's schedule on the host platform 406 can be used at the next highest level 408 to coordinate the user's schedule across multiple platforms. For example, a user may have more than one platform at home, or multiple platforms at different locations, such as at home and the office. Schedules across all of these platforms can be coordinated. The user's schedule across the multiple platforms can be used at the highest level 410 where the overall user's schedule, for both online and non-online activity, is coordinated.

Figure 5:
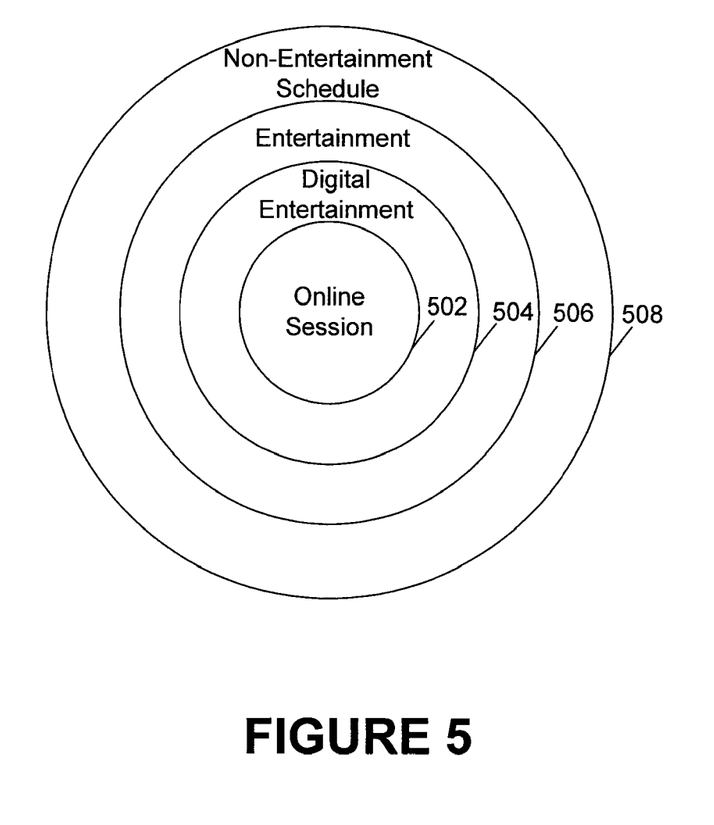
FIG. 5 is a diagram illustrating another embodiment of layering of the scheduling technique.

FIG. 5 is a diagram illustrating another embodiment of the layering of a scheduling technique. As shown in FIG. 5, at the lowest layer 502 is a scheduler of an online session, such as an online game scheduler. At this level a user can use the scheduling techniques described herein to set up a schedule for the online session based on the user's preferences. The online schedule at the lowest level 502 can be used at the next highest level 504 where schedules for the user's digital entertainment are coordinated. For example, the digital entertainment schedule can include when the user will play an online game as well as when the user wants to listen to music, or surf the internet, or other digital entertainment activities. The digital entertainment schedule can be used at the next highest level 506 where other, non-digital forms of entertainment by the user are scheduled. For example, the schedule can include when a user is scheduled to play a softball game at a local park with friends, or plans on going surfing or skateboarding, or other entertainment activities. The user's entertainment schedule can be used at the next highest level 508 where non-entertainment activities of the user are scheduled. For example, at this level, the user's schedule can include business meetings, or doctor appointments, or other types of non-entertainment activity as well as the user's entertainment activities.

In the embodiments described in FIGS. 4 and 5, information about scheduling can flow in both directions, from lower levels to higher levels as well as from higher levels to lower levels. For example, a user may have a regularly scheduled online game session every Wednesday from 8:00 to 10:00 PM. This information can be used by higher level schedules to try and not schedule another activity during these periods. Also, a user may schedule a business meeting for Saturday from 10:00 to 11:00 AM. This schedule information can be used by the online session scheduler so that it will not schedule an online game session during this period.

Schedules can have some flexibility. For example, if a user has an online session scheduled for a particular time, and then tries to schedule a doctor appointment, but the only time available for the doctor appointment conflicts with the online session, the user can select which of the two activities has the higher priority and adjust the schedule accordingly.

In another embodiment, a user may want to watch a movie online with other online users that meet desired criteria. The user can schedule a time to watch the movie and identify the other people who are going to participate in the online movie session. For example, the user may identify particular individuals with whom the user would like to watch the movie, such as friends or a type of individuals with whom the user would like to watch the movie (e.g., hockey fans). The scheduler can then search through the schedules and profiles of other users to determine who is available during the desired time and meets the criteria set by the user.

In another embodiment, the scheduler can enhance the online entertainment and socialization aspects of individuals. For example, individuals may wish to share the same online entertainment activity and also be able to talk to each other at the same time. For example, two sisters may have grown up watching a television game show like Jeopardy. One of the reasons that the sisters enjoyed watching Jeopardy may have been that they could shout out the answers. Now that the sisters are grown they may live in different cities and can no longer watch Jeopardy together. Using an online session scheduler technique, the two sisters can schedule an online session where they both watch Jeopardy online and simultaneously share a voice channel so that they can interact with each other. In another embodiment, an online movie could be watched by a group of users that also share a voice channel so that they can comment about the movie while they are watching it. In still another embodiment, family members could schedule an online session to watch home movies and at the same time share a voice channel so that the family members can share their thoughts with each other while watching the home movie.

In one embodiment, the scheduler has flexibility so that the users can respond to scheduling requests with suggestions for other schedules. If a requesting user sends out an invitation for an online session, another user can respond that the scheduled time does not work, but it is close to working. For example, a request could be sent out to schedule an online session for "Wednesday from 7:00 to 8:00 PM". A user may receive the request and not be available during that time period, but may be available Wednesday from 8:00 to 9:00 PM. The user can respond to the request and suggest an alternative time. Using this technique, a schedule may be developed that supports most of the users. In another example, an invitation for an online session from 8:00 to 10:00 PM is sent to a group of users. One user could reply that he/she is available but only from 9:00 to 10:00 PM. Upon receiving this response, the requester can modify the invitation to be from 9:00 to 10:00 PM, or the user can join the online session when he/she is available.

Figure 6:
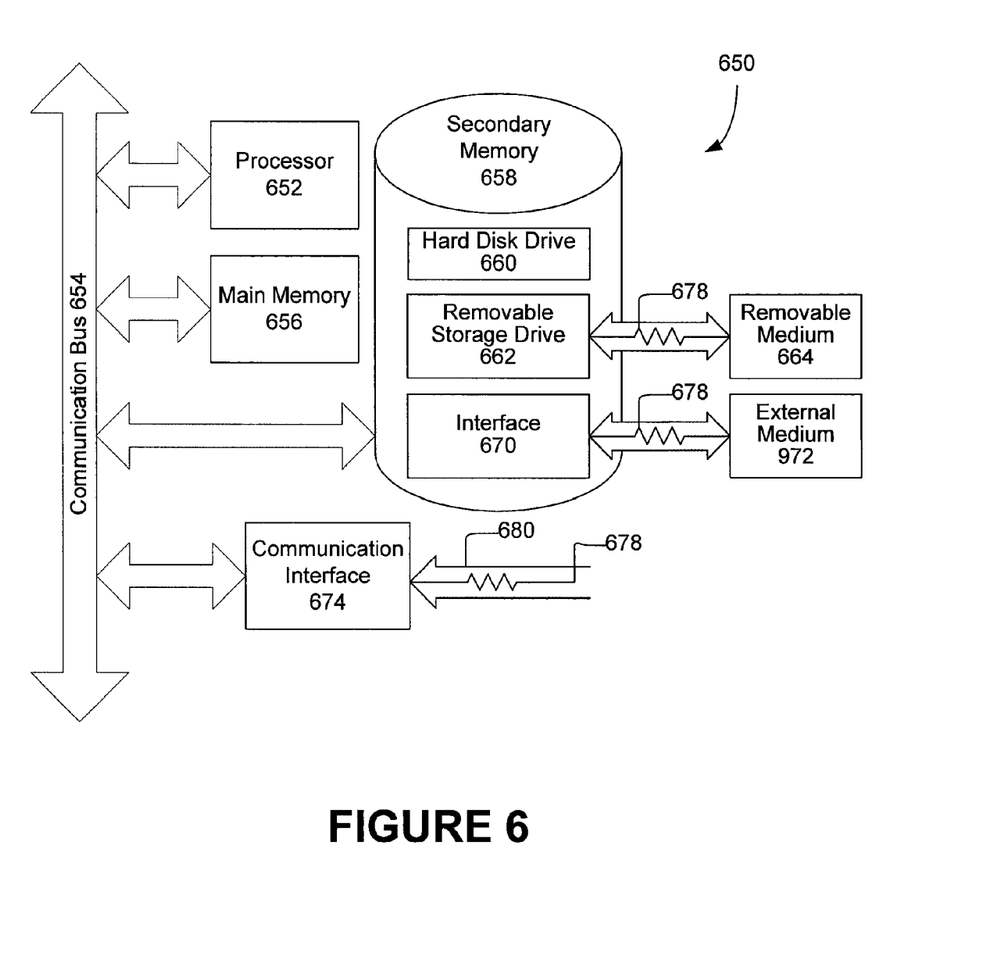
FIG. 6 is a block diagram illustrating an example network enabled device that may be used in connection with various embodiments described herein.

FIG. 6 is a block diagram illustrating an example network enabled device 650 that may be used in connection with various embodiments described herein. For example, the scheduler embodiments described herein may be implemented on the network enabled device 650 of FIG. 6. Other network enabled devices, such as other computers or game consoles and/or architectures may be used, as will be clear to those skilled in the art.

The network enabled device 650 preferably includes one or more processors, such as processor 652. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor, for example if parallel processing is to be implemented. Such auxiliary processors or coprocessors may be discrete processors or may be integrated with the processor 652.

The processor 652 is connected to a communication bus 654. The communication bus 654 may include a data channel for facilitating information transfer between storage and other peripheral components of the computer system 650. The communication bus 654 further may provide a set of signals used for communication with the processor 652, including a data bus, address bus, and control bus (not shown). The communication bus 654 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

The network enabled device 650 includes a main memory 656 and may also include a secondary memory 658. The main memory 656 provides storage of instructions and data for programs executing on the processor 652. The main memory 656 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 658 may optionally include a hard disk drive 660 and/or a removable storage drive 662, for example a floppy disk drive, a magnetic tape drive, a compact disc ("CD") drive, a digital versatile disc ("DVD") drive, a memory stick, etc. The removable storage drive 662 reads from and/or writes to a removable storage medium 664 in a well-known manner. Removable storage medium 664 may be, for example, a CD, DVD, a flash drive, a memory stick, etc.

The removable storage medium 664 is a computer readable medium having stored thereon computer executable code (i.e., software) and/or data. The computer software or data stored on the removable storage medium 664 is read into the computer system 650 as electrical communication signals 678.

In alternative embodiments, secondary memory 658 may include other similar means for allowing computer programs or other data or instructions to be loaded into the computer system 650. Such means may include, for example, an external storage medium 672 and an interface 670. Examples of external storage medium 672 may include an external hard disk drive or an external optical drive, or and external magneto-optical drive.

Other examples of secondary memory 658 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 672 and interfaces 670, which allow software and data to be transferred from the removable storage unit 672 to the network enabled device 650.

The network enabled device 650 may also include a communication interface 674 which allows software and data to be transferred between the network enabled device 650 and external devices, networks, or information sources. For example, computer software or executable code may be transferred to network enabled device 650 from a network server via communication interface 674. In addition, the communication interface 674 can establish and maintain communications, both wired and wireless, to external networks, such as the Internet. Examples of communication interface 674 include a modem, a network interface card ("NIC"), a communications port, a PCMCIA slot and card, an infrared interface, and an IEEE 1394 fire-wire, a wireless LAN, an IEEE 802.11 interface, an IEEE 802.16 interface, a Blue Tooth interface, a mesh network interface, just to name a few.

Communication interface 674 implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via the communication interface 674 are generally in the form of electrical communication signals 678. These signals 678 are provided to communication interface 674 via a communication channel 680. The communication channel 680 carries the signals 678 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) can be stored in the main memory 656 and/or the secondary memory 658. Computer programs can also be received via the communication interface 674 and stored in the main memory 656 and/or the secondary memory 658. Such computer programs, when executed, enable the computer system 650 to perform the various functions of the present invention as previously described.

In this description, the term "computer readable medium" is used to refer to any media used to store data and/or provide computer executable code (e.g., software and computer programs) to the network enabled device 650. Examples of these media include main memory 656, secondary memory 658 (including hard disk drive 660, removable storage medium 664, and external storage medium 672), and any peripheral device communicatively coupled with communication interface 674 (including a network information server or other network device). These computer readable mediums are means for providing executable code, programming instructions, and software, or storing and/or recording data to the network enabled device 650.

In an embodiment that is implemented using software, the software may be stored on a computer readable medium and loaded into the network enabled device 650 by way of removable storage drive 662, interface 670, or communication interface 674. In such an embodiment, the software is loaded into the network enabled device 650 in the form of electrical communication signals 678. The software, when executed by the processor 652, preferably causes the processor 652 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The term "module" as used herein means, but is not limited to a software or hardware component, such as an FPGA or an ASIC, which performs certain tasks. A module may advantageously be configured to reside on an addressable storage medium and configured to execute on one or more network enabled devices or processors. Thus, a module may include, by way of example, components, processes, functions, attributes, procedures, subroutines, segments of program code, drivers, firmware, microcode, circuitry, data, databases, data structures, tables, arrays, variables, and the like. The functionality provided for in the components and modules may be combined into fewer components and modules or further separated into additional components and modules. Additionally, the components and modules may advantageously be implemented to execute on one or more network enabled devices or computers.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. Thus, the invention is not intended to be limited to the embodiment shown herein but is to be accorded the widest scope consistent with the principal and novel features disclosed herein.

What is claimed is:

1. A method for scheduling an online session, the method comprising:
   determining desired time slots for the online session;
   determining potential users to participate in the online session during the desired time slots comprising:
      monitoring online behaviors and habits of the potential users;
      developing profiles for each of the potential users based upon the online behaviors of the potential users;
      assigning a weight to each potential user based on a desirability of each potential user's profile;
      generating a schedule of possible time slots that are convenient for each of the potential users based on the monitored online behaviors and habits;
      comparing the schedule of possible time slots and the desire time slots for the online session, and comparing the assigned weight of each potential user;
      selecting the potential users based on the comparison between the schedule of possible time slots and the desired time slots for the online session, and based on the comparison of the assigned weight of each potential user;
   wherein the selected potential users include at least one permanent user and at least one non-permanent user;
   wherein the at least one permanent user is a potential user that is able to participate in the online session for the entirety of the online session;
   wherein the at least one non-permanent user is a potential user that is not able to participate in the online session for the entirety of the online session;
   sending invitations to the selected potential users;
   receiving responses to the invitations thereby identifying participants for the online session; and
   entering the online session into the calendars of the participants of the online session.

2. The method of claim 1, further comprising a first non-permanent user and a second non-permanent user, wherein the first non-permanent user is replaced by the second non-permanent user at a pre-determined time during the online session.

3. The method of claim 2, wherein determining potential users is based on the profiles of the potential users.

4. The method of claim 2, wherein determining desired time slots is based on the profiles of the potential users.

5. The method of claim 1, wherein sending invitations comprises sending a text message.

6. The method of claim 1, wherein sending invitations comprises sending an email.

7. The method of claim 1, wherein receiving responses comprises receiving alternative times for the online session.

8. The method of claim 1, wherein the online session comprises an online game.

9. The method of claim 1, wherein the online session comprises an interactive multimedia session including an online game session and a movie viewing session between the participants.

10. A method of scheduling an online session, the method comprising:
monitoring online behaviors of users;
developing profiles for each of the users based upon the online behaviors of the users;
receiving a request for the online session from a requesting user, wherein the request includes a list of desired users for the online session;
assigning a weight to each of the users of list of desired users based on a desirability of each user's profile to the requesting user;
providing the requesting user with a list of potential time slots for the online session;
selecting at least one time slot from the list of potential time slots wherein based on the online behaviors of each user and the assigned weight of each user on the list of desired users a maximum number of users on the list of desired users will be online during the at least one selected time slot,
wherein the maximum number of users include at least one permanent user and at at least one non-permanent user,
wherein the at least one permanent user is a user that is able to participate in the online session for the entirety of the online session, and
wherein the at least one non-permanent user is a user that is not able to participate in the online session for the entirety of the online session;
sending invitations for the online session to be held at the at least one time slot to the users on the list of desired users;
receiving responses accepting the invitations to the online session thereby identifying participants for the online session; and
entering the online session into the calendar of the users on the list of desired users that accepted the invitation.

11. The method of claim 10, further comprising selecting at least one alternative time slot if a desired number of responses accepting the invitations is not reached.

12. The method of claim 10, wherein sending invitations comprises sending a text message.

13. The method of claim 10, wherein sending invitations comprises sending an email.

14. The method of claim 10, further comprising receiving responses that suggest alternative times for the online session.

15. The method of claim 10, wherein the online session comprises an online game.

16. The method of claim 10, wherein the online session comprises an interactive multimedia session including an online game session and a movie viewing session between the participants.

17. A controller that schedules a session on a network, the controller comprising:
a network interface that receives and sends data to the network;
a processor that monitors user data on the network to determine profile information of behaviors of users on the network; and
a memory that stores the profile information,
wherein the processor receives a request for the session on the network,
wherein the request includes a list of desired users for the session,
wherein each user of the list of desired users is assigned a weight based on a desirability in the profile information of each user,
wherein the processor determines a list of potential time slots for the session on the network,
wherein the processor selects at least one time slot from the list of potential time slots wherein based on the online behaviors of users on the list of desired users, a maximum number of the users on the list of desired users will be online during potential time slots,
wherein the maximum number of users include at least one permanent user and at least one non-permanent user,
wherein the at least one permanent user is a user that is able to participate in the online session for entirety of the online session, and
wherein the at least one non-permanent user is a user that is not able to participate in the online session for the entirety of the online session.

18. The controller of claim 17, wherein the processor further comprises
a selection element to select at least one time slot from the list of potential time slots.

19. The controller of claim 18, wherein the processor further comprises
a sending element to send invitation for the session on the network to be held at the at least one time slot to the desired users.

20. The controller of claim 19, wherein the processor further comprises
a receiving element to receive responses accepting the invitations to the online session thereby identifying participants for the session on the network; and
an entering element to enter the session on the network into the calendar of the desired users that accepted the invitation.

* * * * *